2,263,574

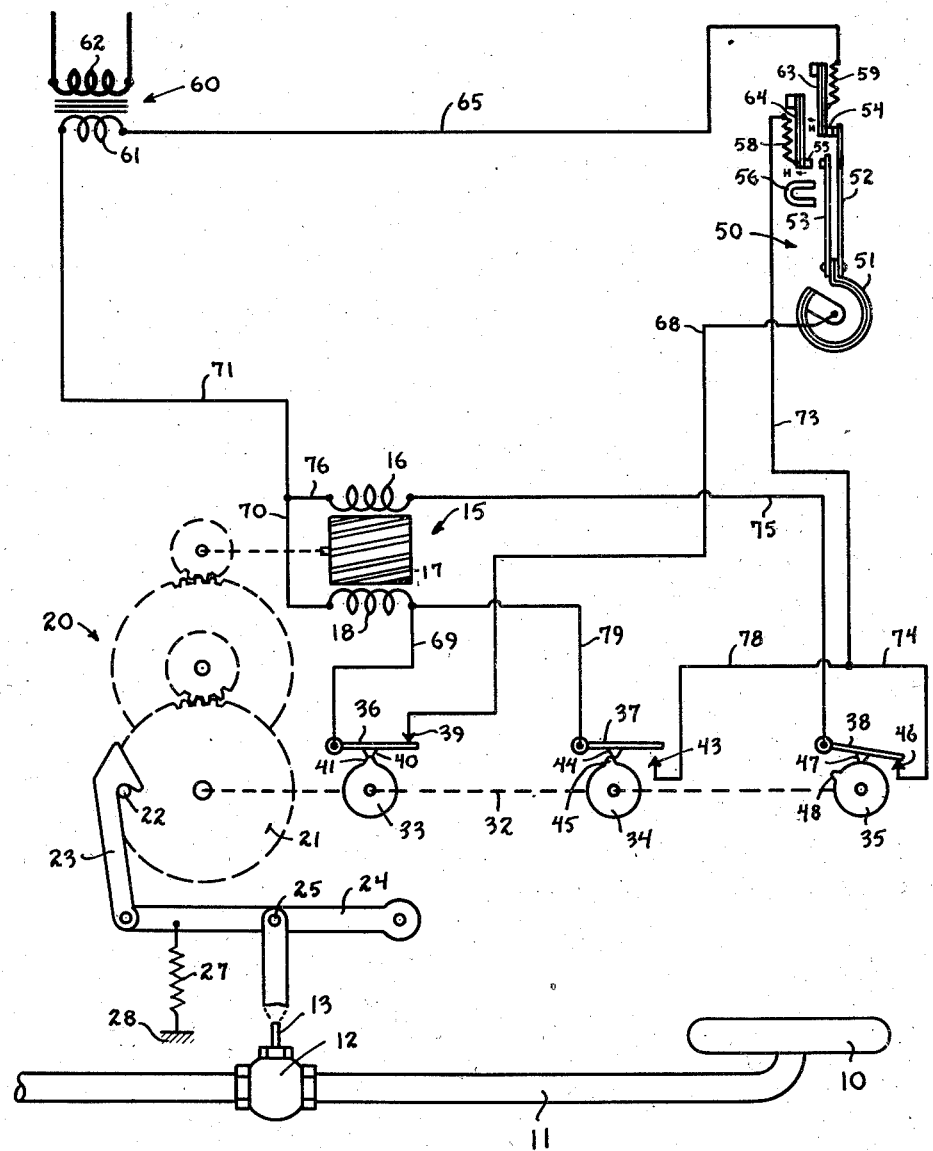
Nov. 25, 1941. W. H. GILLE 2,263,574
TEMPERATURE CONTROLLING MECHANISM
Filed Dec. 30, 1939
Inventor
Willis H. Gille
By George H. Fisher
Attorney Patented Nov. 25, 1941

UNITED STATES PATENT OFFICE 2,263,574

TEMPERATURE CONTROLLING MECHANISM

Willis H. Gille, St. Paul, Minn., assignor to Minneapolis-Honeywell Regulator Company, Minneapolis, Minn., a corporation of Delaware Application December 30, 1939, Serial No. 311,879

19 Claims. (Cl. 236—68)

The present invention is concerned with improvements of temperature controlling mechanism and more particularly to multi-stage motorized valves.

In the temperature control art it is often desirable to have a regulating device moved to either of two active positions depending upon the demand for heat. In the ordinary temperature controlling system, the regulator is commonly moved from a position in which no heat is being supplied to the heated region to a position in which heat is being supplied at a maximum rate. The tendency of this is to produce an uneven delivery of heat often leading to either overheating or underheating during certain periods of the operation. The present invention is particularly concerned with a motorized valve which is moved to either of two open positions depending upon the position of a controlling thermostat.

An object of the invention is broadly to provide a motorized regulator biased to a first position and which is moved and held in either an intermediate or a second position by the motor depending upon whether one or two thermostatically actuated sequentially operated switches are closed.

A further object of the invention is to provide such an arrangement in which the motor means is a single rotary electric motor which is energized in one manner to hold the regulator against its bias and in another manner to move the regulator.

A further object of the present invention is to provide such an arrangement in which when the regulator is in its biased position no movement of the regulator is effected until both sets of contacts are made whereupon the regulator is moved through the intermediate position directly to the second position.

A further object of the invention is to provide an arrangement of the type discussed whereby provision is made when the regulator is returning from its second position to the first position and the thermostat is calling for the regulator being in intermediate position for temporarily energizing the motor in a manner to cause it to exert lifting action if the regulator moves beyond intermediate position towards its biased position.

Another object of the present invention is to provide a two-stage temperature control system controlled by a two-stage thermostatic switch in which auxiliary heat is employed to anticipate the temperature change, the anticipating effect being at either a high or a low rate dependent upon whether the thermostat is calling for the regulator being in its high heat position or its intermediate heat position.

Other objects of the invention will be apparent from a consideration of the accompanying specification, claims and drawing.

In the single figure of the drawing, the mechanism of the present invention is shown in schematic form in connection with a gas burner control system.

Referring to the drawing, a gas burner is designated by the reference numeral 10, this gas burner being supplied with gas through a pipe 11. The flow of gas through pipe 11 is controlled by a valve 12, the valve stem of which is indicated by the reference numeral 13.

A motor generally designated by the reference numeral 15 is employed to position the valve. The motor 15 comprises a rotor 17, a lifting field winding 16 and a holding field winding 18. The rotor 17 is connected through a reduction gear train 20 to a gear 21 carrying a pin 22. The pin 22 is adapted to engage a hook 23 pivotally secured to a lever 24. The lever 24 is in turn pivotally secured at 25 to the valve stem 13. A spring 27 has one end secured to lever 24 and the other end to a rigid support 28. The spring 27 tends to urge the valve downwardly to closed position. When both the holding field winding 18 and the lifting field winding 16 of the motor are energized, the motor is able to rotate the gear 22 in a clockwise direction with considerable force. The effects of this clockwise rotation is to cause the pin 22 to engage hook 23 rotating the lever 24 in a clockwise direction and thus move valve stem 13 upwardly towards open position. When only the holding winding 18 is energized, the motor torque is insufficient to counteract the force exerted by biasing spring 27. It is sufficient, however, to counteract the tendency of spring 27 to return the valve to closed position so that the motor is able when only the holding winding 18 is energized to hold the valve in any desired position.

Secured to gear 21 is a shaft schematically illustrated in the drawing by the reference numeral 32. This shaft has secured thereto three cams 33, 34, and 35. Associated with cams 33, 34, and 35 are switch blades 36, 37, and 38. The switch blade 36 is adapted to be moved into engagement with a fixed contact 39. The switch blade 36 carries a cam follower 40 which is adapted to be engaged by a projecting portion 41 of the cam 33 to effect such engagement of switch blade 36 with contact 39. The projecting portion 41 of cam 33 is so located that the switch 36 is moved into engagement with contact 39, as shown, when the valve is in the desired intermediate position.

Switch blade 37 is adapted normally to engage with fixed contact 43. The switch blade 37 carries a cam follower 44 which is adapted to be engaged by a projection 45 on the cam 34. When cam follower 44 is engaged by the projection 45, the switch blade 37 is moved out of engagement with contact 43. The projecting portion 45 is so located that this separation of switch blade 37 from contact 43 occurs just after switch blade 36 is moved into engagement with contact 39 as the valve is being opened. It will be noted that projecting portion 45 is extremely short so that switch blade 37 is only separated from contact 43 for a very brief interval except when the valve is maintained in the mid position as shown in the drawing.

The switch blade 38 normally engages a fixed contact 46. The switch blade 38 carries a cam follower 47 which is adapted to be engaged by a projection 48 of cam 35. The engagement of projection 48 with the cam follower 47 causes switch blade 38 to be separated from fixed contact 46. The projection 48 is so located on cam 35 that switch 38 is moved away from contact 46 when the valve reaches its open position.

The main control switch is generally designated by the reference numeral 50. This switch may take any form and provision is made for several different switch positions. In the illustrated embodiment of the invention, switch 50 is shown in the form of a room thermostat. This thermostat comprises a bimetallic element 51 and two switch blades 52 and 53 secured to the bimetallic element 51. Switch blades 52 and 53 are adapted to engage fixed contacts 54 and 55 carried by bimetallic elements 63 and 64, respectively. A magnet 56 is positioned adjacent switch blade 53 to impart a snap action to blade 53 when it approaches or recedes from contact 55. When both of the contact carrying elements 63 and 64 are at the same temperature, the spacing between blade 52 and contact 54 is less than the spacing between blade 53 and contact 55. The bimetallic element is so disposed that upon a temperature fall, the blades are moved to the left. Thus as the temperature falls, blade 52 is first moved into engagement with contact 54, as shown, and blade 53 is subsequently moved into engagement with contact 55. Located adjacent to the bimetallic element 64 is an electrical heater 58 having one terminal connected to contact 55. Secured adjacent bimetallic element 63 is a second heater 59 having one terminal connected to contact 54. The bimetallic members 63 and 64 are so disposed as to move contacts 54 and 55 to the left upon being heated. Members 63 and 64 are further designed so as to be relatively unaffected by changes in ambient temperature as compared with bimetallic element 51, either by being relatively insensitive or by being compensated in any conventional manner for ambient temperature. In any event, the two members 63 and 64 should be equally affected, if at all, by ambient temperature so that changes in ambient temperature will not affect the relative spacings of the two pairs of contacts.

Low voltage power is supplied to the system by a step-down transformer generally indicated by the reference numeral 60. This transformer comprises a low voltage secondary 61 and a line voltage primary 62. The line voltage primary is connected to any suitable source of power (not shown).

*Operation*

The various elements of the system are shown in the position assumed when the temperature has been sufficiently low as to cause engagement of both blades 52 and 53 with their respective contacts but has risen to a value such that only blade 52 remains in engagement with its associated fixed contact. With the thermostat in this position and with the valve in its intermediate position as shown, switch 36 is maintained in engagement with contact 39 and the following circuit to the holding field winding 18 is maintained: from the right-hand terminal of secondary 61 through conductor 65, heater 59, contact 54, switch blade 52, bimetallic element 51, conductor 68, contact 39, switch blade 36, conductor 69, field winding 18, and conductors 70 and 71 to the other terminal of secondary 61. The valve, when maintained in this position, allows a relatively small amount of fuel to be supplied to the burner so as to maintain a low flame. In relatively mild weather, this low flame may be sufficient to maintain the region being heated at the desired temperature.

If the burner 10 is not able to supply sufficient heat to the region in which thermostat 50 is located, the switch blade 53 will again engage contact 55 whereupon the following circuit will be established to the lifting winding 16: from the right-hand terminal of secondary 61 through conductor 65, heater 59, bimetallic element 63, contact 54, switch blades 52 and 53, contact 55, heater 58, conductors 73 and 74, contact 46, switch blade 38, conductor 75, lifting winding 16, and conductors 76 and 71 to the other terminal of secondary 61. The establishment of this circuit causes simultaneous energization of both the lifting and holding windings to cause movement of the valve towards open position. As soon as the valve has moved a short distance toward open position, switch blade 37 engages contact 43 whereupon a new energizing circuit is established to holding winding 18 as follows: from the right-hand terminal of secondary 61 through conductor 65, heater 59, bimetallic element 63, contact 54, switch blades 52 and 53, contact 55, heater 58, conductors 73 and 78, contact 43, switch blade 37, conductor 79, holding winding 18, and conductors 70 and 71 to the other terminal of secondary 61. It will be noted that this new holding circuit is independent of the engagement of the switch blade 36 with contact 39. Substantially at the same time as switch blade 37 engages contact 43, switch blade 36 is separated from contact 39. The circuit previously traced to the lifting winding 16 and the newly traced circuit to the holding winding 18 are maintained until the valve reaches its open position, at which time switch blade 38 is moved away from contact 46. When this happens, the circuit traced to lifting winding 16 is interrupted so that only holding winding 18 remains energized. The result of this is that the motor torque is now reduced to a value just sufficient to maintain the valve in open position against the action of biasing spring 27.

The valve will remain in open position so long as both thermostat blades 52 and 53 are engaged with contacts 54 and 55. The continnued operation of the burner at maximum capacity will eventually cause a rise in the temperature effecting thermostat 50 so as to cause separation of switch blade 53 from contact 55. Upon this happening, the circuit to holding winding 18 through switch blade 37 and contact 43 is interrupted with the result that the motor is completely de-energized. The biasing means 27 is now able to rotate the motor and gear train in a reverse direction and move the valve 12 towards closed position. When the valve reaches the intermediate position, switch blade 40 will be engaged with contact 39. This will re-establish the circuit to holding winding 18 through switch blades 36 and 39 first traced in the above description of the operation. The energization of this holding winding will retard movement of the valve by the biasing means 27.

It may happen that the momentum of the motor and gear train in valve closing direction will be sufficiently high that the energization of the holding winding 18 will not terminate valve movement. In other words, the valve will tend to coast beyond the intermediate position in spite of the energization of the holding winding. In order to prevent this, provision is made for temporarily reenergizing the lifting winding. As soon as the valve moves slightly past the intermediate position towards closed position, switch blade 37 will reengage with contact 43. It will be noted that a very slight counter-clockwise movement of cam 34 from the intermediate position shown in the drawing is necessary to effect reengagement of switch blade 37 with contact 43. It will further be noted that the relatively slight amount of movement necessary to effect such engagement is not sufficient to cause disengagement of switch blade 36 from contact 39. The result will be that switch blades 36 and 37 will be simultaneously in engagement with their associated contacts 39 and 43. When this occurs, an energizing circuit will be established to lifting winding 16 as follows: from the upper terminal of secondary 61 through conductor 65, heater 59, conductor 66, contact 54, bimetallic element 51, bimetallic element 63, contact 39, switch blade 36, conductors 69 and 79, switch blade 37, contact 43, conductors 78 and 74, contact 46, switch blade 38, conductor 75, lifting winding 16, and conductors 76 and 71 to the other terminal of secondary 61. The energization of the lifting winding 16 will cause the motor to be energized with sufficient torque to abruptly stop further downward movement of valve 13 and initiate upward movement of the valve towards open position. This movement will be relatively slow at first. After only a slight amount of such movement in valve opening direction has taken place, the projection 45 will again engage cam follower 44 to separate switch blade 37 from contact 43. This will interrupt the circuit to the lifting winding just traced and further opening movement of the valve will be terminated. The valve will now remain in the intermediate position with the various elements in the position shown.

If the outside weather conditions are such that more heat is supplied with the valve in its intermediate position than is necessary for maintaining the room temperature at the desired value, switch blade 52 will also separate from contact 54. As will be explained later, this separation is aided by the effect of the heating element 59 on the bimetallic element 63. When the switch blade 52 does separate from the contact 54, all of the energizing circuits to the motor 15 will be interrupted so that the valve will move to closed position.

The apparatus is designed so that the valve remains in open position until both switch blades 52 and 53 move into engagement with their respective contacts 54 and 55. In other words, nothing happens when switch blade 52 reengages contact 54. When both switch blades engage their contacts, the valve is then moved to wide open position as called for by the position of the thermostat. The purpose of this is to insure that a full flow of gas will initially be established to the burner. In the case of gaseous fuels particularly it is highly undesirable to start the burner operation with a small flow of gas since this tends to result in backfiring due to the air accumulated in the burner producing an explosive mixture. As soon as both contacts 54 and 55 are made, the previously traced circuit to the lifting winding 16 is established. At the same time, the circuit to the holding winding through contacts 54 and 55 and through contact 43 and switch blade 37 will be established so that both field windings are energized and the motor is able to lift the valve. This energizing circuit for the holding winding 18 will be momentarily interrupted as the valve passes through its intermediate position. This will not terminate movement of the valve, however, since switch 36 is moved against contact 39 simultaneously with the separation of switch 37 from contact 43. As previously pointed out, a circuit to the holding winding through switch blade 52 and contact 54 is established whenever switch blade 36 is engaged with contact 39. The result will be that one or the other energizing circuits to holding winding 18 will be continuously maintained with the result that the valve is moved to open position. When the valve reaches open position switch blade 38 will be separated from contact 46 causing deenergization of the lifting winding 16 in the manner previously described.

In tracing the circuits to both the lifting and holding coils of motor 15, heater elements 58 and 59 were referred to. It will be noted that the circuit to holding winding 18 during the time the valve is in intermediate position includes only the heating element 59. While the valve is in open position however, the circuit to holding winding 18 includes both heaters 58 and 59. When heater 59 is energized, this heater serves to heat the bimetallic element 63 and cause a quicker separation of switch blade 52 from contact 54 than would otherwise occur. Thus when the system is operating with the valve in intermediate position, the heater 59 tends to terminate the burner operation before it would normally terminate by reason of the resultant rise in room temperature. The ordinary heating system has such a lag that heat will continue to be supplied after the burner operation has been terminated. If the burner is maintained in operation solely in accordance with room temperature, there will be an excessive overshooting of the temperature. By adjusting the position of contact 54 through the action of heater 59 and the bimetallic element 63, it is possible to anticipate the delivery of heat to the room. The heater 58 has the same effect on the contact 55 as heater 59 does in connection with contact 54. In other words, when the burner is operating on its high stage, heater 58 tends to cause a quicker separation of switch blade 53 from contact 55 than would occur solely by reason of the rise in room temperature. The result is that the change in room temperature resulting from the delivery of heat at the higher rate is anticipated by the action of heater 58.

One feature of the present invention is that the heaters 58 and 59 are associated with bimetallic elements carrying contacts 54 and 55 rather than being associated with the main bimetallic element 51. In the case of a single stage thermostat, it is entirely satisfactory to place the anticipating heater adjacent the main bimetallic element. In the case of a two stage thermostat such as is employed in connection with the present invention, however, the use of a plurality of heaters adjacent the main thermostatic element results in an undesirable increase in the differential of the thermostat. It can be readily seen that if heater 59 were associated with the bimetallic element and were energized upon engagement of switch blade 52 with contact 54, the difference in the temperatures at which engagement of switch blades 52 and 53 with their respective contacts took place would be increased. This is the case because the action of heater 59 would affect the room temperature at which switch blade 53 engaged contact 55. By mounting contact 54 upon the bimetallic element 63 and placing the heater 59 adjacent the bimetallic element 63, the action of heater 59 has substantially no effect upon the value of the room temperature at which switch blade 53 engages the contact 55. By means of the disclosed arrangement, it is possible to have two stages of heat anticipation without affecting the differential of the thermostat.

It will be noted from the foregoing description that I have provided improved temperature controlling mechanism of a multi-stage type. While the invention has been described in connection with a motorized two-stage valve for a gas system, it is to be understood that the invention is not necessarily so limited and that certain features thereof are applicable to any multi-stage temperature control system. It is further understood that while only two stages have been described, the invention is applicable to a system requiring a greater number of stages. In general, while I have shown a specific embodiment of the invention for purposes of illustration, it is to be understood that the invention is limited only by the scope of the appended claims.

I claim as my invention:

1. In combination, a condition controlling device movable between first and second positions, means biasing said device to said first position, a rotary electrical motor operatively connected to said device, condition responsive switching means including two pairs of contacts sequentially engaged as the condition changes in one direction, circuit connections operative upon engagement of both of said pairs of contacts to cause energization of said motor such that the torque is sufficient to move said device against the action of said biasing means toward said second position, switching means positioned by said motor and operative to alter said circuit connections upon said device being moved to said second position and upon continued engagement of both sets of contacts to affect the energization of the motor in a manner such that the torque is reduced to a value just sufficient to hold said device but not to move it, said circuit connections being rendered inoperative to maintain energization of said motor upon the separation of the first to be disengaged of said pairs of contacts, and further circuit connections including said switching means positioned by said motor and the last to be disengaged of said pairs of contacts operative upon said device being moved to an intermediate position to reenergize said motor in a manner such that the torque is again just sufficient to hold said device against the action of said biasing means.

2. In a control device for a fluid fuel burner, a valve controlling the flow of fuel to said burner, a rotary electrical motor connected to said valve, motor controlling means including a device responsive to a condition indicative of the demand for burner operation operative upon said condition assuming a first predetermined value to cause said motor to move said valve to a completely open position and to hold said valve in said position, means operative when said condition changes to a second predetermined value to move said valve to an intermediate position where it is again held by said motor as long as said condition remains within a predetermined range of values including said second value, and means effective when said valve is in said closed position to prevent energization of said motor under the control of said condition responsive device until said condition assumes said first predetermined value at which value said valve is moved to completely open position.

3. In combination, a valve biased to a first position, a motor operatively connected to said valve, said motor when energized in a first manner exerting sufficient torque to move said valve toward a second position and when energized in a second manner exerting just sufficient torque to hold said valve but not to move it, a main control switch having two sequentially engageable pairs of contacts, further switching means positioned by said motor, means including said further switching means operable when both of said pairs of contacts are engaged to cause said motor to be energized in said first manner until said valve is in said second position and to then energize said motor in said second manner, said valve being moved back toward said first position by its bias when the last to be engaged of said pairs of contacts are disengaged, and further means operable when said valve assumes an intermediate position again to energize said motor in said second manner as long as the first to be engaged of said pairs of contacts remains engaged.

4. In combination, a valve biased to a first position, a motor operatively connected to said valve, said motor when energized in a first manner exerting sufficient torque to move said valve toward a second position and when energized in a second manner exerting just sufficient torque to hold said valve but not to move it, a main control switch having two sequentially engageable pairs of contacts, further switching means positioned by said motor, means including said further switching means operable when both of said pairs of contacts are engaged to cause said motor to be energized in said first manner until said valve is in said second position and to then energize said motor in said second manner, said valve being moved back toward said first position by its bias when the last to be engaged of said pairs of contacts are disengaged, further means operable when said valve assumes an intermediate position again to energize said motor in said second manner as long as the first to be engaged of said pairs of contacts remains engaged, and means operable if said valve is moved by said biasing means beyond said intermediate position while the first to be engaged of said pairs of contacts is engaged to reenergize said motor in said first manner until said valve is again in said intermediate position.

5. In a control device for a fluid fuel burner, a thermostat provided with two switches adapted to be closed successively as the temperature drops, electrical operating means energized when both switches are closed to supply fuel for a high flame, means for maintaining said high flame until one of said switches opens and for subsequently maintaining a lower flame until both switches are open or both switches closed, auxiliary heating means for varying the operation of said thermostat, and means for causing said heating means to deliver a relatively large amount of heat when both switches are closed and a relatively small amount of heat when only one switch is closed.

6. In a temperature control system, a thermostatic controller movable between an off position, a low on position, and a high on position, a temperature changing means located remotely from said controller, means including said controller operative when said controller is in said high on position to cause said temperature changing means to supply a relatively fixed maximum amount of heat and when said controller is in said low on position to supply a relatively fixed lesser amount of heat, auxiliary heating means for varying the operation of said thermostatic controller, and means effective when said thermostatic controller is in said high on position to cause said auxiliary heating means to supply a relatively large fixed amount of heat which is greater than that supplied when said thermostatic controller is in said low on position.

7. In a temperature control system, a thermostat having two switches which are closed successively as the temperature drops, temperature changing means, a temperature regulating device therefor movable between minimum heat, low heat, and high heat positions, means including said thermostat operable when said regulating device is in minimum heat position to cause movement of said regulator only upon closure of both of said switches, such movement being to high heat position, means operable upon one of said switches being opened to move said regulator back to low heat position and to maintain it in said position until either both of said switches are again closed or until both of said switches are opened, and auxiliary heating means for varying the operation of the thermostat, said auxiliary heating means being effective to supply a large amount of heat when both switches are closed and a relatively small amount of heat when only one switch is closed and said regulator is in low heat position.

8. In a control device for fluid fuel burners, the combination of a thermostat provided with two switches adapted to be successively closed as the temperature drops, a fuel conduit leading to the burner, means actuated only by the closing of both switches to establish and maintain a full flow of fuel through said conduit until said second switch opens, and for maintaining a smaller flow of fuel through said conduit after said second switch opens until the first switch also opens or until the second switch again closes, auxiliary heating means for affecting the operation of said thermostat, and means for causing said auxiliary heating means to deliver more heat when both switches are closed than when only one switch is closed and said smaller flow of fuel is being maintained.

9. In a temperature control system, a thermostat comprising a temperature responsive element and two pairs of sequentially engaging contacts, temperature changing means, a temperature regulating device therefor movable between minimum heat, low heat, and high heat positions, means including said thermostat operable upon engagement of both of said pairs of contacts to cause said regulator to assume said high heat position, means for maintaining said regulator in said high heat position until separation of one of said pairs of contacts and for subsequently maintaining said regulator in said low heat position until both of said pairs of contacts are again in engagement or are separated, and means associated with each pair of contacts and operative upon engagement of said pair of contacts to tend to cause separation of said pair of contacts without affecting the relative positions of the contacts of said other pair of contacts.

10. In a temperature control system, a thermostat comprising a main temperature responsive element connected to one each of two pairs of sequentially engaging contacts, a separate temperature responsive element secured to each of said other contacts, temperature changing means, a temperature regulating device therefor movable between minimum heat, low heat, and high heat positions, means including said thermostat operable upon engagement of both of said pairs of contacts to cause said regulator to assume said high heat position, means for maintaining said regulator in said high heat position until separation of one of said pairs of contacts and for subsequently maintaining said regulator in said low heat position until both of said pairs of contacts are again in engagement or are separated, and means operable when either or both pairs of contacts are in engagement to locally heat the separate temperature responsive elements of those pairs of contacts which are in engagement.

11. In combination, a valve biased to closed position, a motor operatively connected to said valve and having holding and lifting windings, main control switch means having two sequentially engageable pairs of contacts, a second switch opened by said motor when said valve is moved to valve open position, a third switch moved to closed position when said valve is in an intermediate position, an energizing circuit for said lifting winding controlled by the last to be engaged of said pairs of contacts and said second switch, an energizing circuit for said holding winding controlled by the last to be engaged of said pairs of contacts, said two above named circuits being effective upon engagement of both pairs of contacts to energize said holding and lifting windings to cause said motor to move said valve to valve open position and to maintain said holding winding energized as long as both pairs of contacts are energized, and a second energizing circuit for said holding winding controlled by only the first to be engaged of said pairs of contacts and by said third switch, said second energizing circuit for said holding winding being effective to maintain said holding winding energized when only one pair of contacts is engaged and when said valve is in said intermediate position.

12. In combination, a valve biased to closed position, a motor operatively connected to said valve and having holding and lifting windings, main control switch means having two sequentially engageable pairs of contacts, a second switch opened by said motor when said valve is moved to valve open position, a third switch moved to closed position when said valve is in an intermediate position, an energizing circuit for said lifting winding controlled by the last to be engaged of said pairs of contacts and said second switch, an energizing circuit for said holding winding controlled by the last to be engaged of said pairs of contacts, said two above named circuits being effective upon engagement of both pairs of contacts to energize said holding and lifting windings to cause said motor to move said valve to valve open position and to maintain said holding winding energized as long as both pairs of contacts are engaged, a second energizing circuit for said holding winding controlled by only the first to be engaged of said pairs of contacts and by said third switch, said second energizing circuit for said holding winding being effective to maintain said holding winding energized when only one pair of contacts is engaged and when said valve is in said intermediate position, and means for establishing a further energizing circuit to said lifting winding under the control of the first to be engaged of said pairs of contacts when the valve is within a limited range on the closed side of said intermediate position, said further energizing circuit being effective when said valve and motor coast beyond intermediate position in closing while said first to be engaged of said pairs of contacts is engaged to cause said motor to check said closing movement of said valve and return said valve to intermediate position.

13. In combination, a valve biased to closed position, a motor operatively connected to said valve and having holding and lifting windings, main control switch means having two sequentially engageable pairs of contacts, a second switch opened by said motor when said valve is moved to valve open position, a third switch moved to closed position when said valve is in an intermediate position, a fourth switch moved to open position during a portion of the limited range of movement in which said third switch is closed, an energizing circuit for said lifting winding controlled by the last to be engaged of said pairs of contacts and said second switch, an energizing circuit for said holding winding controlled by the last to be engaged of said pairs of contacts and said fourth switch, said two above named circuits being effective upon engagement of both pairs of contacts to energize said holding and lifting windings to cause said motor to move said valve to valve open position and to maintain said holding winding energized as long as both pairs of contacts are engaged, a second energizing circuit for said holding winding controlled by only the first to be engaged of said pairs of contacts and by said third switch, said second energizing circuit for said holding winding being effective to maintain said holding winding energized when only one pair of contacts is engaged and when said valve is in said intermediate position, and a further energizing circuit for said lifting winding controlled by said third and fourth switches in series and operative when said valve and motor coast beyond intermediate position in closing while said first to be engaged of said pairs of contacts is engaged to cause said motor to check said closing movement of said valve and return said valve to intermediate position.

14. In combination, a valve movable between open and closed positions, means biasing said valve to closed position, a rotary electrical motor operatively connected to said valve, main switching means including two control switches, circuit connections operative upon closure of both of said control switches to cause energization of said motor such that the torque is sufficient to move said valve against the action of said biasing means towards open position, switching means positioned by said motor and operative to alter said circuit connections upon said valve being moved to open position and upon continued closure of both of said control switches to affect the energization of the motor in a manner such that the torque is reduced to a value just sufficient to hold the valve but not to move it, said circuit connections being rendered inoperative to maintain energization of said motor upon the opening of a first of said control switches, and further circuit connections including said switching means positioned by said motor and a second of said control switches operative upon said valve being moved to an intermediate position to re-energize said motor in a manner such that the torque is again just sufficient to hold said valve against the action of said biasing means.

15. In combination, a valve biased to a first position, a motor operatively connected to said valve, said motor when energized in a first manner exerting sufficient torque to move said valve toward a second position and when energized in a second manner exerting just sufficient torque to hold said valve but not to move it, first and second control switches, further switching means positioned by said motor, means including said further switching means operable when both control switches are closed to cause said motor to be energized in said first manner until said valve is in said second position and then to energize said motor in said second manner, said valve being moved back toward said first position by its bias when both control switches are open, and further means operable when said valve assumes an intermediate position again to energize said motor in said second manner as long as said first control switch is closed.

16. In a control device for a fluid fuel burner, a thermostat provided with two switches adapted to be closed successively as the temperature drops, electrical operating means energized when both switches are closed to supply fuel for a high flame, means for maintaining said high flame until one of said switches opens and for subsequently maintaining a lower flame until both switches are open or both switches closed, a pair of auxiliary heaters for varying the operation of said thermostat, means for causing one of said heaters to be operated only when both switches are closed, and means for causing the other of said heaters to be operated whenever the first to be closed of said switches is closed.

17. In a control device for a fluid fuel burner, a thermostat provided with two switches adapted to be closed successively as the temperature drops, electrical operating means energized when both switches are closed to supply fuel for a high flame, means for maintaining said high flame until one of said switches opens and for subsequently maintaining a lower flame until both switches are open or both switches closed, an auxiliary heater for varying the operation of said thermostat, and means for causing said heater to be operated only when both switches are closed.

18. In a temperature control system, heating means including heat generating means therefor, regulating means therefor, a thermostat provided with two switches adapted to be closed successively as the temperature drops, means to cause said regulating means to operate said heat generating means to generate heat at a high rate when both switches are closed, to operate said heat generating means to generate heat at a lower rate when the temperature rises to open one of said switches, and to terminate generation of heat by said heat generating means when the temperature rises sufficiently to open both of said switches, an auxiliary heater for varying the operation of said thermostat, and means for causing said heater to be operated only when both switches are closed.

19. In a temperature control system, heating means including means for generating heat therefor, regulating means therefor, a thermostat provided with two switches adapted to be closed successively as the temperature drops, means to cause said regulating means to operate said heat generating means to generate heat for said heating means at a high rate when both switches are closed, to lower the rate at which heat is generated for said heating means when the temperature rises to open one of said switches and to terminate operation of said heat generating means when the temperature rises sufficiently to open both of said switches, an electrical heater for varying the operation of said thermostat, and means connecting said electrical heater to a source of power in series with the last to be engaged of said switches so that said heater is energized only when both switches are closed.

WILLIS H. GILLE.